Nov. 2, 1926.

E. C. WEISGERBER 1,605,312

CONDENSER

Filed May 18, 1923

Inventor:
Edwin C. Weisgerber

Patented Nov. 2, 1926.

1,605,312

UNITED STATES PATENT OFFICE.

EDWIN C. WEISGERBER, OF LOS ANGELES, CALIFORNIA.

CONDENSER.

Application filed May 18, 1923. Serial No. 639,803.

My invention relates to a means for speedily reducing the temperature of vapors, and it has especial reference to a condenser for oil vapors of the hydrocarbon class. The object of the invention is to provide a simple and economical device in which a maximum condensation of vaporous products developed in a still may be effected and, in which large cooling surface areas may be incorporated to permit unimpeded diffusion and bring about rapid condensation of the vapors.

These and other objects are accomplished by a form of condenser shown in the accompanying drawing, in which—

Figure 1:
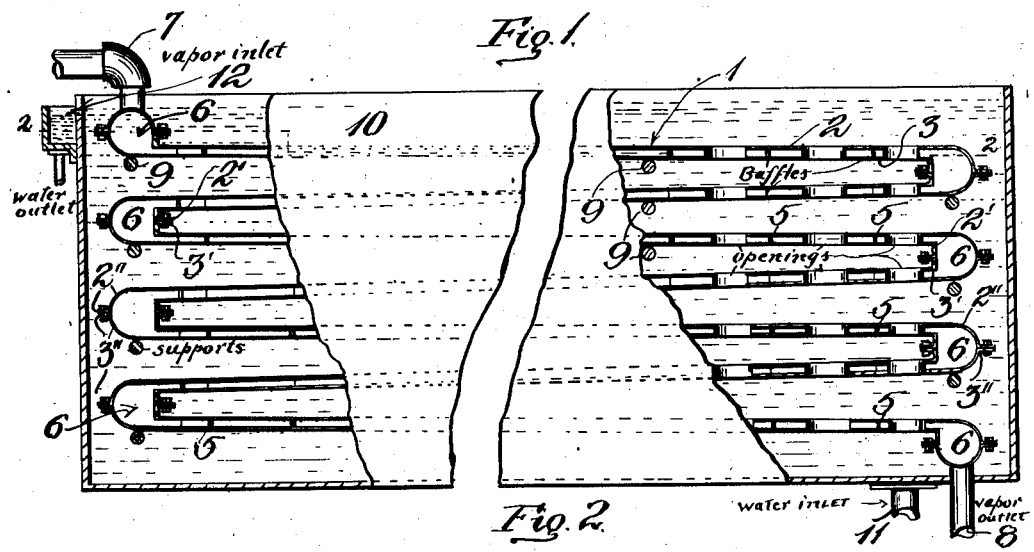
Fig. 1 is a section taken approximately on line 1—1 of Fig. 2, showing a water tank and a vapor condensing arrangement, constructed according to the present invention, within said tank.
Figure 2:
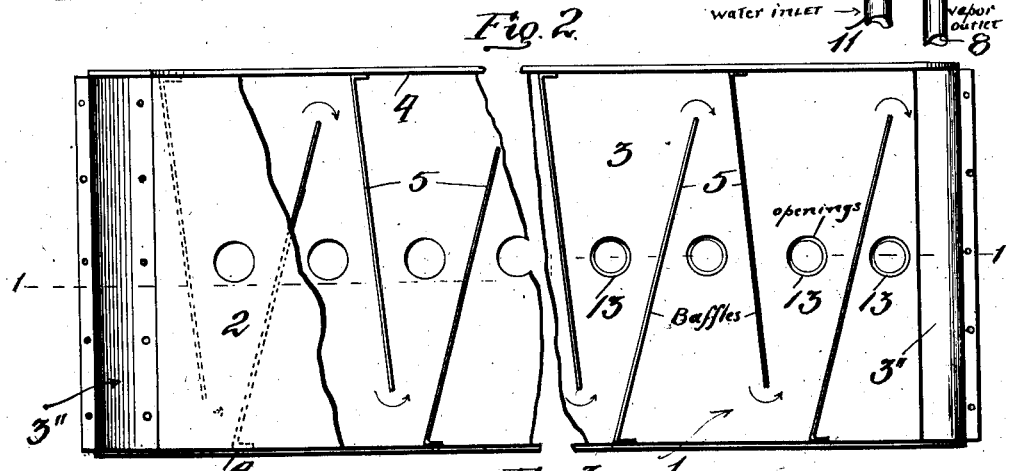
Fig. 2 is a section on line 2—2 Fig. 1, showing one of the condensing compartments of the interconnected series, and, Fig. 3 is a fragmentary perspective view showing spaced, interconnected compartments with baffling means therein.
Figure 3:
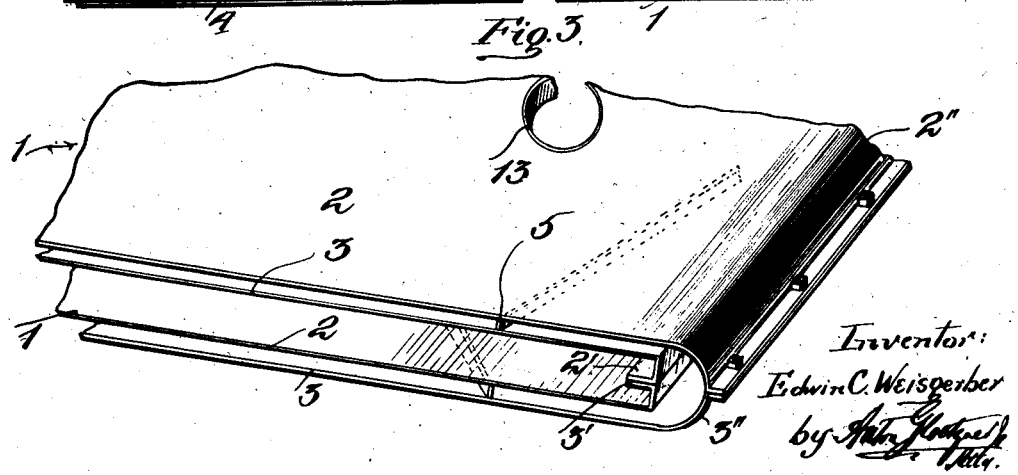

My invention comprises in general a plurality of superposed, transcalent compartments constructed and designed to effect the rapid extraction and absorption of the heat of the vapors passing through the compartments and the speedy condensation of such vapors whereby to recover the highest percentage of condensable products.

Each compartment 1, is preferably flat, and for purposes of the present invention, may consist of a top plate 2 and a bottom plate 3 with enclosing walls 4, the plates 2 and 3 being held spaced by a plurality of baffles 5, which function to retard the travel of the vapors and cause same to pass through the compartments in a zig-zag manner. As seen, the compartments 1 are alternately inclined to the horizontal to cause a gravitational flow of the condensate from one compartment to another, and the baffles 5 are disposed at angles to the plane of the enclosing walls 4 of the compartments. The plates 2 and 3 of each of the several compartments 1 are arranged for connection with similar plates of other compartments to provide a continuous passageway for the vapors and condensates. For this purpose, each plate 2 and 3 is formed at one end with a rectangular flanged bend 2' and 3' respectively and at the other end with a flanged curve 2" and 3" respectively, the rectangular flanged bends 2' and 3' of the plates 2 and 3 being bolted or otherwise fastened together and the flanged curves 2" and 3" of the plates 2 and 3 being bolted or otherwise fastened. Each compartment 1 of the condenser communicates directly with a header or corridor 6, formed, as seen, by the conjoining of one compartment with another and through such headers 6 the vapors and condensates travel from the vapor inlet 7, through the various compartments 1, to the outlet 8.

The various compartments 1 are suitably supported, by cross bars or members 9, in a tank 10, supplied with a cooling fluid or liquid, as water, through pipe 11. The liquid in said tank escapes therefrom through a cut out 12.

To increase the radiating surface of the condenser compartments and also the circulation of the water, the compartments are provided with openings 13 for permitting the water to pass through same.

What I claim, is:

A condenser for vapors of petroleum oils comprising a plurality of flat pan-like compartments alternately inclined to the horizontal and severally composed of flat plates having water circulating passages extending vertically therethrough and conjoined with similar plates of other compartments at their respective ends, and providing a continuous passageway for the vapors and condensates, the conjoined end of the several compartments forming headers establishing communication between the compartments, transverse baffles within said compartments and spacing the plates, said baffles disposed within said compartments to cause the vapors and condensates to travel in a zig-zag direction, and a container for said compartments.

In testimony whereof I have set my hand

EDWIN C. WEISGERBER.